United States Patent [19]
Osajima et al.

[11] Patent Number: 5,520,943
[45] Date of Patent: May 28, 1996

[54] METHOD FOR MODIFYING THE QUALITY OF LIQUID FOODSTUFF

[75] Inventors: Yutaka Osajima, Fukuoka; Mitsuya Shimoda, Fukuoka-ken; Tamotsu Kawano, Ichikawa, all of Japan

[73] Assignee: Nippon Tansan Co., Ltd., Tokyo, Japan

[21] Appl. No.: 291,484

[22] Filed: Aug. 17, 1994

[30] Foreign Application Priority Data

Oct. 27, 1993 [JP] Japan .................. 5-291230

[51] Int. Cl.⁶ ............................ C12H 1/00
[52] U.S. Cl. ........................... 426/422; 426/488
[58] Field of Search .................. 426/422, 478, 426/486, 487, 488, 490

[56] References Cited

U.S. PATENT DOCUMENTS

| | | | |
|---|---|---|---|
| 3,966,981 | 6/1976 | Schultz | 426/430 |
| 4,714,591 | 12/1987 | Avedesian | 422/140 |

OTHER PUBLICATIONS

IFIS Abstract published Oct. 1991 for Hakkokogaku Kaishi article (1989 67 (s)) AN 91(10):E0029 FSTA. Taniguchi, M. (Author).
IFIS Abstract published Sep. 1987 for Agriculture & Biological Chem. article (1987 51 (2)) AN 87(09):C0040 FSTA. Kamihira et al (Authors).
IFIS Abstract published Oct. 1991 for Journal of Food Sci. article (1991 56 (3)) AN 91(10):H0071 FSTA. Balaban et al (Authors).
Patent Abstracts of Japan. Sect. No. 824, vol. 15, No. 15 published Apr. 1991 for Japan 3027268.

*Primary Examiner*—Anthony J. Weier
*Attorney, Agent, or Firm*—Nixon & Vanderhye

[57] ABSTRACT

The quality of a liquid foodstuff is modified by contacting it with micron-size carbon dioxide particles in a supercritical state. These particles are generated by supplying supercritical carbon dioxide through a filter with a mesh size of not more than 100 µm in average diameter. The liquid foodstuff was processed and contacted with carbon dioxide particles in a treating tank.

12 Claims, 1 Drawing Sheet

METHOD FOR MODIFYING THE QUALITY OF LIQUID FOODSTUFF

BACKGROUND OF THE INVENTION

The present invention relates to a method for modifying the quality of a liquid foodstuff, and more particularly it relates to a method of modification of the quality of a liquid foodstuff for attaining such effects as amelioration of smell of the liquid foodstuff, deactivation of enzymes in the liquid foodstuff and sterilization thereof. The liquid foodstuff-quality modification method of the present invention is one which utilizes carbon dioxide in a supercritical state, so that this method is highly safe in practice thereof and, further, does not require specific high-temperature heating step or heating step under reduced pressure.

Soy sauce which is one of fermented foodstuffs, is a typical Japanese seasoning which has gained popularity overseas along with dishes of Japanese cuisine in recent years. Soy sauce, however, is disliked in part by Japanese and foreigners because of its peculiar smell. It is, therefore, considered a key factor for elevating the utility and value of soy sauce to remove the peculiar smell (odor) of soy sauce and to enhance its mild aroma.

Sake, which is another fermented foodstuff, is generally produced through the following steps. In the first step, fermented rice is compressed and filtered to obtain shinshu (green sake). In the second step, this obtained green sake is sterilized by heating at 60°–65° C. and stored. In the third step, a number of lots of the stored sake which have been heat-treated are properly blended to determine the sake quality (light or dry, etc.) and the alcohol content is adjusted to standards. In the fourth (final) step, the thus prepared sake is again sterilized by heating and then bottled or packed. Thus, in the production of sake, the heat-treatment is conducted twice, in the second and forth steps in the manufacturing process, to effect deactivation of enzymes and sterilization.

The fresh flavor of green sake is sharply reduced by two heat-treatments in the manufacturing process, so that consumers request fresh sake which has been produced without undergoing any heat-treatment. However, green sake, although fresh in taste and smell, is very changeable in flavor because of its high enzymatic activity. There are marketed some brands of non-heat-treated sake said at low temperature as fresh sake, but such fresh sake is subject to deterioration of quality by the action of certain enzymes such as α-amylase, protease and carboxy-peptidase, which poses the problem of increased distribution costs to prevent of such qualitative deterioration.

In order to solve the above problem, attempts have been made to remove such enzymes in the green sake by precision filtration or ultra-filtration, but sufficient removal of the enzymes has been impossible with such means. Further, the enzyme removal using a membrane has the problem that the aromatic components of green sake may be dissolved in the membrane during the process and/or that some kinds of taste components of green sake may be removed, thereby losing its relish.

Also, with reference to muddled fruit drinks such as orange juice, etc., it is considered that the cloud of the drink is a decisive factor for the quality of the drink. Deactivation of pectin esterase (PE) is essential for maintaining the stability of this cloud, but since PE is an enzyme stable to heat, usually a heat-treatment under a high-temperature condition (88°–99° C. or 120° C.) is required for deactivation of this enzyme. However, the heat-treatment at such high temperature causes deterioration of freshness and characteristic taste of the drink.

As a result of intensive studies for solving the above problems, it has been found that by contacting carbon dioxide of a supercritical state with a liquid foodstuff in a specific condition, the desired amelioration of smell, deactivation of enzymes and sterilization can be accomplished effectively. On the basis of the finding, the present invention has been attained.

SUMMARY OF THE INVENTION

An object of the present invention is to provide a method for modifying the quality of a liquid foodstuff, which method has high safety in practice thereof and avoids high temperature heat treatment.

Another object of the present invention is to provide a method for ameliorating the smell of a fermented liquid foodstuff.

Still another object of the present invention is to provide a method for deactivation of enzymes in an enzyme-containing liquid foodstuff.

Yet another object of the present invention is to provide a sterilization method for a liquid foodstuff.

To attain the aims, in a first aspect of the present invention, there is provided a method for modifying the quality of a liquid foodstuff, comprising contacting the liquid foodstuff to be treated with carbon dioxide of a supercritical state supplied through a filter with a mesh size of not more than 100 μm in average diameter (average size) in a treating tank.

In a second aspect of the present invention, there is provided a method for ameliorating smell of a liquid foodstuff, comprising contacting a fermented liquid foodstuff to be treated with carbon dioxide of a supercritical state supplied through a filter with a mesh size of not more than 100 μm in average diameter (average size) in a treating tank.

In a third aspect of the present invention, there is provided a method for deactivating enzymes in a liquid foodstuff, comprising contacting an enzyme-containing liquid foodstuff to be treated with carbon dioxide of a supercritical state supplied through a filter with a mesh size of not more than 100 μm in average diameter (average size) in a treating tank.

In a fourth aspect of the present invention, there is provided a sterilization method for a liquid foodstuff, comprising contacting the liquid foodstuff to be treated with carbon dioxide of a supercritical state supplied through a filter with a mesh size of not more than 100 μm in average diameter (average size) in a treating tank.

DETAILED DESCRIPTION OF THE INVENTION

Figure 1:
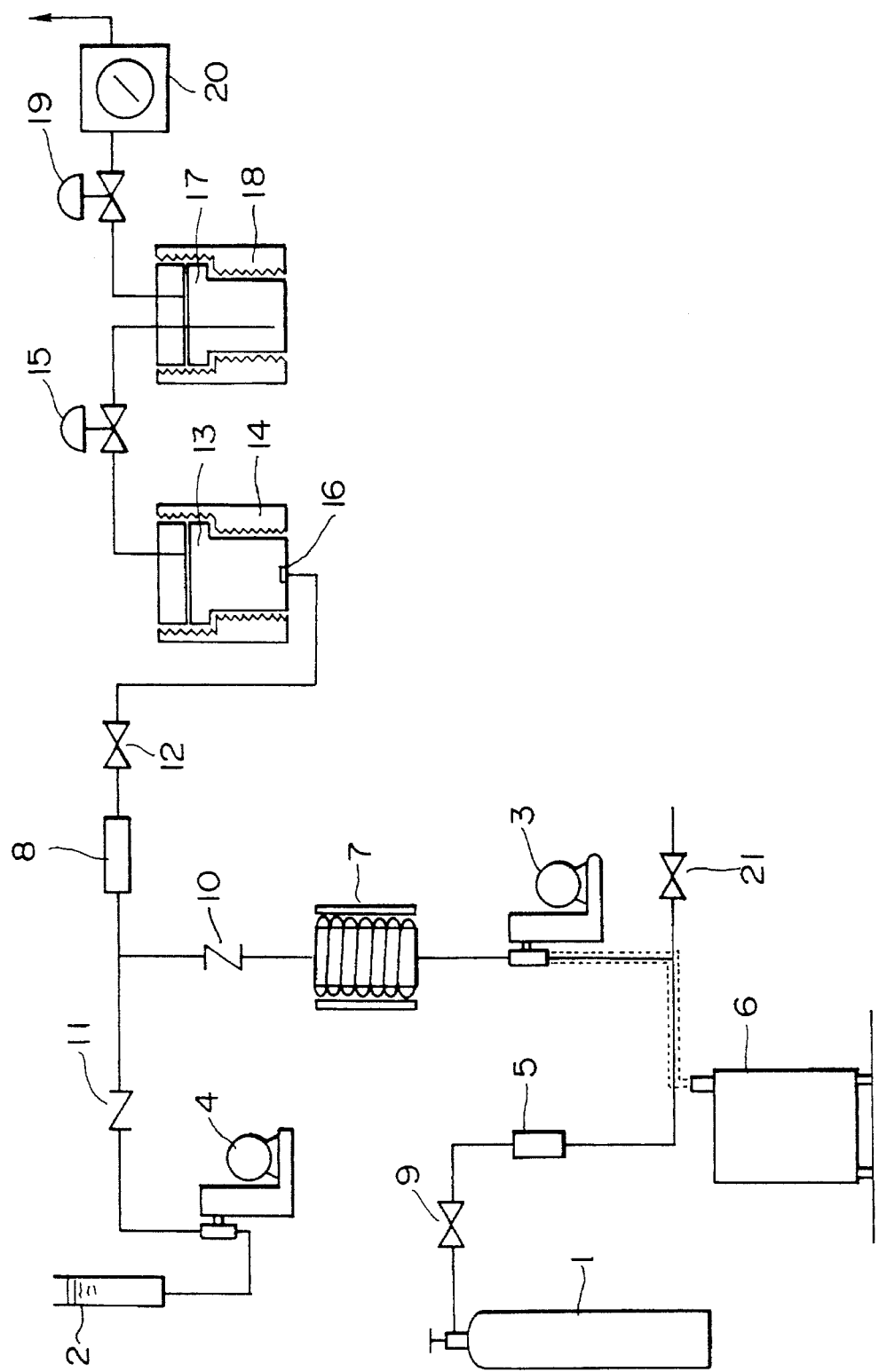
FIG. 1 is a block diagram illustrating a treating method of the present invention.

The liquid foodstuffs to which the method of the present invention can be applied include, as typical examples, fermented liquid foodstuffs such as soy sauce, sake, beer, wine and the like, and various kinds of fruit juice. The soy sauce may be prepared from soybean or fish. The fruit juices contemplated as "liquid foodstuff" in the present invention are those prepared from apple, grape and various kinds of citrus fruits, but they also include the juices produced from tomato and other vegetables.

In the present invention, carbon dioxide is used as a supercritical fluid obtained by pressurizing carbon dioxide under a pressure of 70 to 400 atm, preferably 100 to 300 atm, more preferably 150 to 300 atm, and the temperature is 30° to 70° C., preferably 30° to 50° C. Carbon dioxide in its supercritical state may hereinafter be referred to as "carbon dioxide fluid".

It is essential that the carbon dioxide fluid be brought into sufficient contact with the liquid foodstuff to be treated. For attaining this, in the present invention, the carbon dioxide fluid is supplied as a micron fluid state (micro-particle fluid state) into the liquid foodstuff. More specifically, carbon dioxide of a supercritical state is supplied through a filter with a mesh size of not more than 100 μm in average diameter and brought into contact with the liquid foodstuff in a treating tank. The kind of the filter used in the present invention is not specified, but it is recommended to use a filter made of a sintered metal such as copper, bronze, stainless steel, nickel, monel metal, silver, platinum or the like. In the present invention, it is preferable to use a filter with a mesh size of not more than 50 μm, more preferably not more than 20 μm in average diameter. Usually, the lower limit of the mesh size of the filter is 1 μm.

The contact time between the liquid foodstuff and the carbon dioxide fluid is variable depending on the kind of the liquid foodstuff to be treated and the desired degree of modification. For example, it is 1 to 120 minutes. In the case of treating the green sake, a contact time of usually 10 to 60 minutes, preferably 20 to 30 minutes is required.

In the present invention, does usually not require the addition of an entrainer, but if necessary, it may be added in an amount of not more than 5 wt % based on the carbon dioxide fluid. In the case of the liquid foodstuff containing no alcoholic substance, ethyl alcohol is preferably used as entrainer. The treatment with the carbon dioxide fluid may be either batchwise or continuous.

The liquid foodstuff which has been subjected to contacting-treatment with the carbon dioxide fluid so as to modify in quality as desired, can be easily recovered by restoring ordinary temperature and ordinary pressure conditions to the liquid foodstuff. The recovered liquid foodstuff remains unaffected in flavor, even though microorganisms such as lactic bacteria therein have been sterilized. Also, the foodstuff treated by the carbon dioxide fluid is not deteriorated in quality during storage.

In the process shown in FIG. 1, an entrainer container 2 is provided as occasion demands, and a treating tank 13 includes a pressure vessel. The internal temperature and pressure of the treating tank 13 can be adjusted to maintain a constant by a tank heater 14 and a pressure regulator 15. A filter 16 is provided at the bottom of the treating tank 13. The internal temperature and pressure of a separating tank 17 can be adjusted by a tank heater 18 and a pressure regulator 19.

In operation, carbon dioxide is led out from a liquefied carbon dioxide gas cylinder 1, passes through a valve 9 and a filter 5, and (after cooling carbon dioxide by a cooler 6 so as to liquefy carbon dioxide, when carbon dioxide is in a gaseous form) is supplied into a line mixer 8 through a heater 7 and a check valve 10 by a pump 3. In case an entrainer is used, it is supplied from an entrainer container 2 into the line mixer 8 through a check valve 11 by a pump 4 and mixed with carbon dioxide in the line mixer 8.

Then carbon dioxide (and entrainer) is passed through a valve 12 and a filter 16 to enter the treating tank 13, in which the liquid foodstuff to be treated is contained. Carbon dioxide is turned into a supercritical state by properly operating the pump 3, the heater 7, the tank heater 14 and the pressure regulator 15, and supplied in this supercritical state into the treating tank 13. Also, carbon dioxide is supplied in micron size (microparticle) by passing through the filter 16 into the treating tank 13. It is also possible to provide carbon dioxide turned into a supercritical state as it is supplied into the treating tank 13.

The carbon dioxide fluid contacted with the liquid foodstuff is led into the separating tank 17 where the carbon dioxide fluid is released from its supercritical state by operating the tank heater 18 and the pressure regulator 19. The gasified carbon dioxide is discharged out of the system through a flowmeter 20. A valve 21 is provided as a preliminary means for discharging carbon dioxide out of the system at a halfway point before supplied into the treating tank 13.

The modification method according to the present invention has a high operational safety, requires no high-temperature heating and is capable of producing excellent effects in the amelioration of smell of the liquid foodstuff, the deactivation of enzymes and the sterilization.

EXAMPLES

The present invention is further illustrated below with reference to the examples. These examples, however, are merely intended to be illustrative and not to be construed as limiting the scope of the invention in any way.

Test Example 1

A test liquid containing the substances having an offensive odor and a carbon dioxide fluid were contacted with each other according to the process illustrated in FIG. 1. As the test liquid, an aqueous solution containing hexanal, octanal, decanal, hexanol, decanol and undecanol, each in a concentration of 50 ppm, was used. A filter made of a sintered metal (SUS 316) and having a mesh size of 10 μm in average diameter was used as a filter 16 provided at the bottom of a treating tank 13. No entrainer was used.

First, 450 ml of the test liquid containing the offensive odor-substances was fed into the treating tank 13 (500 ml) while starting supply of carbon dioxide from a liquefied carbon dioxide gas cylinder 1. Carbon dioxide was passed through a valve 9 and a filter 5, was liquefied by a cooler 6, was heated to 40° C. by a heater 7 and was supplied into the treating tank 13 through a check valve 10, a line mixer 8, a valve 12 and the filter 16 by a pump 3. The pressure and temperature in the treating tank 13 were maintained at 200 atm and 40° C., respectively, by a tank heater 14 and a pressure regulator 15. The feeding rate of the carbon dioxide fluid into the treating tank 13 was set at 10 NL/min, and the contact time between the offensive odor substances-containing test liquid and the carbon dioxide fluid was predetermined to be 40 minutes.

Then, the offensive odor substances-containing test liquid and the carbon dioxide fluid were led into a separating tank 17, and the temperature and pressure of the carbon dioxide fluid in the separating tank 17 were returned to the ordinary level by operating a tank heater 18 and a pressure regulator 19 to release the supercritical state. The gasified carbon dioxide was discharged out of the system through a flowmeter 20. Gas chromatographic analysis of the offensive odor substances-containing test liquid after treatment according to the present invention showed that not less than 95 wt % of each of the offensive odor substances had been removed.

Example 1

450 ml of commercial soy sauce using soybean as a raw material was used as a liquid foodstuff to be treated, and it was contacted with a carbon dioxide fluid of micron size under the conditions of Test Example 1. Gas chromatographic analysis of the soy sauce after the treatment showed that more than 90 wt % of each of the volatile component substances in the soy sauce had been removed. Also, the result of an sensory test by the panelists on the treated soy sauce testified amelioration of mild aroma of the soy sauce after the treatment.

Volatile Component in Soy Sauce:
1,4-Diethylbenzene
Ethyl lactate
Furfural
2,5-Dihydro-2,5-dimethoxyfuran
Dihydroxy-5-methyl-2(3H)-furanone
Isovaleric acid
3-Methylthio-1-propanol
2-Acetylpyrrole
4-Hydroxy-2-ethyl-5-methyl-3(2H)-furanone Test Example 2

An enzyme-containing test liquid and a carbon dioxide fluid were contacted with each other according to the process illustrated in FIG. 1. As the test liquid, an aqueous solution containing gluco amylase adjusted to a concentration of 20 mg/100 ml, was used. A filter made of a sintered metal (SUS 316) and having a mesh size of 10 μm in average diameter was used as a filter 16 provided at the bottom of a treating tank 13. No entrainer was used.

First, 450 ml of the test liquid was supplied into the treating tank 13 (500 ml) while starting the feed of carbon dioxide from a liquefied carbon dioxide gas cylinder 1. Carbon dioxide was passed through a valve 9 and a filter 5, was liquefied by a cooler 6, was heated to 35° C. by a heater 7 and was supplied into the treating tank 13 through a check valve 10, a line mixer 8, a valve 12 and the filter 16 by a pump 3. The pressure and temperature in the treating tank 13 were maintained at 250 atm and 35° C., respectively, by a tank heater 14 and a pressure regulator 15. The feeding rate of the carbon dioxide fluid into the treating tank 13 was 10 NL/min, and the contact time between enzyme-containing test liquid and the carbon dioxide fluid was 30 minutes.

Then, the enzyme-containing test liquid and the carbon dioxide fluid were led into a separating tank 17, and the temperature and pressure of the carbon dioxide fluid in the treating tank 17 were returned to the ordinary level by operating a tank heater 18 and a pressure regulator 19 to release the supercritical state. The gasified carbon dioxide was discharged out of the system through a flowmeter 20. In order to confirm the effect of the micron size carbon dioxide fluid, the same test was conducted by removing the filter 16. As seen from the test results shown in Table 1, the residual enzyme activity could be markedly reduced by use of the filter.

TABLE 1

| Condition | Filter was used | No filter was used |
|---|---|---|
| Residual enzyme activity (%) | 17.3 | 46.4 |

Test Example 3

An aqueous solution containing carboxypeptidase (serine carboxypeptidase), lipase, gluco amylase and acidic protease, each in a concentration of 20–100 mg/100 ml, was used as an enzyme-containing test liquid. This enzyme-containing test liquid and a micron size carbon dioxide fluid were contacted with each other following the same procedure as Test Example 2 except that the temperature of the carbon dioxide fluid supplied into the treating tank 13 and the pressure and temperature in the treating tank 13 were changed as shown in Tables 2 and 3. The ratio (%) of the residual enzyme activity in the solution used for treating the carbon dioxide fluid to the enzyme activity in the non-treated solution was determined, the results being shown in Tables 2 and 3.

TABLE 2

| Enzyme | Carboxypeptidase | | Lipase | |
|---|---|---|---|---|
| Temp. (°C.) | 35 | 40 | 35 | 40 |
| Pressure | | | | |
| 100 atm | 14.13 | 0.00 | 0.17 | 0.00 |
| 150 atm | 0.00 | 0.00 | 0.00 | 0.00 |
| 250 atm | 0.00 | 0.00 | 0.00 | 0.00 |

TABLE 3

| Enzyme | Gluco amylase | | Acidic protease | |
|---|---|---|---|---|
| Temp. (°C.) | 35 | 50 | 45 | 50 |
| Pressure | | | | |
| 100 atm | 60.52 | 0.00 | 47.89 | 12.81 |
| 150 atm | 59.45 | 0.00 | 35.26 | 11.23 |
| 250 atm | 17.46 | 0.00 | 11.28 | 3.80 |

Example 2

450 ml of green sake was used as a liquid foodstuff, and it was contacted with a carbon dioxide fluid of micron size following the same procedure as Test Example 2. The residual enzyme activity (U/ml in sake) in the obtained sake after treatment with the carbon dioxide fluid and the lactobacillus cell count (CFU/ml in sake) after 60-day storage are shown in Table 4. By way of comparison, the residual enzyme activity in the non-treated green sake (Comparative Example 1) and that in the heat-treated sake at 62° C. for 5 minutes (Comparative Example 2) are also shown in Table 4. The result of a sensory test by the panelists on the sake which had been treated with the carbon dioxide fluid ($CO_2$-treated sake), showed that the $CO_2$-treated sake had a good bouquet close to that of non-heated sake. On the other hand, in the result of the sensory test, the sake which had been subjected to the heat-treatment (Comparative Example 2) was inferior to non-heated sake in bouquet. The lactobacillus cell count was determined according to the calibration method making using absorbance (at wavelength of 562 nm).

TABLE 4

|  | Example 2 | Comp. Example 1 | Comp. Example 2 |
| --- | --- | --- | --- |
| Gluco amylase | 0 | 330 | 0 |
| Acidic protease | 1.8 | 20.1 | 2.7 |
| Carboxypeptidase | 0 | 115 | 0 |
| Lactobacillus cell count | 0 | $1.0 \times 10^9$ | 0 |

In the above Example and Comparative Examples, the sake was kept in storage for 60 days and the passage with time of the concentrations of lactic acid and acetic acid were determined. The results are shown in Table 5. As is seen from Table 5, according to the enzyme deactivation process of the present invention, sterilization of the microorganisms such as lactic bacteria is simultaneously accomplished, thus preventing any elevation of concentration of lactic acid or acetic acid during the storage.

TABLE 5

|  | Example 2 | Comp. Example 1 | Comp. Example 2 |
| --- | --- | --- | --- |
| Lactic acid (ppm) | | | |
| After 20 days | 365 | 360 | 355 |
| After 40 days | 365 | 390 | 355 |
| After 60 days | 355 | 430 | 350 |
| Acetic acid (ppm) | | | |
| After 20 days | 45 | 55 | 50 |
| After 40 days | 45 | 65 | 50 |
| After 60 days | 45 | 70 | 50 |

Example 3

U.S.-grown navel oranges available on the market were squeezed by a hand presser to produce a juice, and 450 ml of this obtained juice was used as liquid foodstuff and contacted with a carbon dioxide fluid of micron size under the same conditions as Test Example 2. The pectin esterase (PE) activity in the juice after the treatment with the carbon dioxide fluid was determined, and the ratio (%) of the residual enzyme activity in this treated juice to the enzyme activity in the non-treated juice was calculated, the results being shown in Table 6. In Comparative Example 3, the same treatment and test were conducted by removing the filter 16.

Determination of the PE activity was made according to the Rouse Arkins method (1955). That is, a 1 wt % pectin solution was used as a substrate solution, and it was reacted with the enzyme at 30° C. for 30 minutes and the produced acid was titrated with a 0.02N sodium hydroxide solution to determine the enzymatic activity. An automatic titrator (manufactured by METROM CO., LTD. ) was used for the titration.

TABLE 6

|  | Example 3 | Comp. Example 3 |
| --- | --- | --- |
| Residual enzyme activity (%) | 0.1 | 39.5 |

Example 4

U.S.-grown Valencia oranges available on the market were squeezed by a hand presser to produce a juice and 450 ml of this obtained juice was used as a test liquid foodstuff. This juice and a carbon dioxide fluid of micron size were contacted with each other by following the same procedure as Test Example 2 except that the temperature of the carbon dioxide fluid supplied into the treating tank 13 and the temperature in the treating tank 13 were changed to 45° C. The residual PE activity (%) was calculated in the same way as Example 3. In Comparative Example 4, the same treatment and test were conducted by removing the filter 16. The results are shown in Table 7.

TABLE 7

|  | Example 4 | Comp. Example 4 |
| --- | --- | --- |
| Residual enzyme activity (%) | 6.1 | 43.1 |

The modification method of the present invention described above is a method using carbon dioxide, so that it has high operational safety, requires no high-temperature heating and is capable of producing such effects as an amelioration of smell of liquid foodstuff, a deactivation of enzymes and a sterilization.

What is claimed is:

1. A method for modifying the quality of a liquid foodstuff comprising contacting the liquid foodstuff with micro particles of supercritical carbon dioxide in the fluid state by passing the supercritical carbon dioxide through a filter with a mesh size of not more than 100 μm in average diameter for a period of from about 1 to about 120 minutes in a treating tank.

2. A method for ameliorating the smell of a fermented liquid foodstuff comprising contacting the liquid foodstuff with micro particles of supercritical carbon dioxide in the fluid state by passing the supercritical carbon dioxide through a filter with a mesh size of not more than 100 μm in average diameter for a period of from about 1 to about 120 minutes in a treating tank.

3. A method for deactivating enzymes in an enzyme-containing liquid foodstuff comprising contacting the liquid foodstuff with micro particles of supercritical carbon dioxide in the fluid state by passing the supercritical carbon dioxide through a filter with a mesh size of not more than 100 μm in average diameter for a period of from about 1 to about 120 minutes in a treating tank.

4. A method for sterilizing a liquid foodstuff comprising contacting the liquid foodstuff with micro particles of supercritical carbon dioxide in the fluid state by passing the supercritical carbon dioxide through a filter with a mesh size of not more than 100 µm in average diameter for a period of from about 1 to about 120 minutes in a treating tank.

5. A method according to any one of claims 1, 2, 3 or 4 wherein the mesh size of the filter is 1 to 100 µm in average diameter.

6. A method according to claim 2, wherein the fermented liquid foodstuff is soy sauce.

7. A method according to claim 3, wherein the enzyme-containing liquid foodstuff is green sake.

8. A method according to claim 3, wherein the enzyme-containing liquid foodstuff is juice.

9. A method according to claim 4, wherein the liquid foodstuff is green sake.

10. The method according to any one of claims 1, 2, 3 or 4, wherein the supercritical carbon dioxide fluid is obtained by pressurizing carbon dioxide under a pressure of 70 to 400 atm and the temperature is 30° to 70° C.

11. The method according to any one of claims 1, 2, 3 or 4 wherein the filter is a sintered metal filter composed of copper, bronze, stainless steel, nickel monel metal, silver or platinum.

12. A method according to claim 4, wherein prior to treatment the liquid foodstuff contains lactobacillus bacteria.

* * * * *